United States Patent
Choi et al.

(10) Patent No.: US 8,417,422 B2
(45) Date of Patent: Apr. 9, 2013

(54) VEHICLE PASSENGER CLASSIFICATION SYSTEM USING WEIGHT SENSORS

(75) Inventors: Hyeong Ho Choi, Gwangmyeong-si (KR); Pyoung Sik Shin, Bucheon-si (KR); Tae In Kim, Siheung-si (KR); Sang Gyu Yoon, Seoul (KR); Kyu Jong Kim, Hwaseong-si (KR); Jae Haeng Yoo, Yongin-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 846 days.

(21) Appl. No.: 12/511,794

(22) Filed: Jul. 29, 2009

(65) Prior Publication Data
US 2010/0138078 A1    Jun. 3, 2010

(30) Foreign Application Priority Data
Dec. 2, 2008  (KR) .................. 10-2008-0121103

(51) Int. Cl.
*B60R 22/00* (2006.01)
(52) U.S. Cl. .......... 701/45; 340/438; 340/666; 340/667; 701/49
(58) Field of Classification Search ............. 73/862.391, 73/862.474, 862.53, 862.626; 324/661, 663, 324/665; 340/665, 666, 667, 438; 701/1, 701/45, 49, 124; 180/273
See application file for complete search history.

(56) References Cited

U.S. PATENT DOCUMENTS

| | | | |
|---|---|---|---|
| 6,438,476 B1 * | 8/2002 | Gray et al. ...................... | 701/45 |
| 2001/0005074 A1 * | 6/2001 | Sakai et al. ................. | 280/728.1 |
| 2002/0007240 A1 * | 1/2002 | Winkler ......................... | 701/49 |
| 2002/0043789 A1 * | 4/2002 | Lichtinger et al. ............ | 280/735 |
| 2004/0006418 A1 * | 1/2004 | Sakai .............................. | 701/45 |
| 2004/0159486 A1 * | 8/2004 | Mutou et al. .................. | 180/273 |
| 2007/0187156 A1 * | 8/2007 | Buchel et al. ............... | 177/25.13 |

FOREIGN PATENT DOCUMENTS

| | | |
|---|---|---|
| KR | 10-0837919 B1 | 6/2008 |
| KR | 10-0856987 B1 | 9/2008 |

* cited by examiner

*Primary Examiner* — Khoi Tran
*Assistant Examiner* — Stephen Holwerda
(74) *Attorney, Agent, or Firm* — Morgan, Lewis & Bockius LLP

(57) ABSTRACT

A system and method are provided for vehicle passenger classification. The system may include a plurality of weight sensors installed under a seat frame to support a load of a vehicle seat, a single dummy sensor installed under the seat frame to support the load of the vehicle seat along with the plurality of weight sensors, and a passenger classification logic unit for classifying a passenger value obtained by summing sensor values of the plurality of weight sensors as either class 1 or class 2 by comparing the passenger value with a first reference and a second reference.

15 Claims, 3 Drawing Sheets

VEHICLE PASSENGER CLASSIFICATION SYSTEM USING WEIGHT SENSORS

CROSS-REFERENCE TO RELATED APPLICATION

The present application claims priority to Korean Application Patent No. 10-2008-0121103, filed on Dec. 2, 2008, the entire contents of which application is incorporated herein for all purposes by this reference.

BACKGROUND OF THE INVENTION

1. Field of the Invention

The present invention relates generally to a vehicle passenger classification system, and, more particularly, to a vehicle passenger classification system using a plurality of weight sensors installed under a vehicle seat.

2. Description of the Related Art

In an existing weight detection-type passenger detection system currently applied to the front passenger's seat, sensors are installed under a seat frame at four locations, four pieces of data measured by these sensors are transferred to the Electronic Control Unit (ECU) of the passenger detection system, and the type of passenger in the seat is identified based on the sum of the four pieces of data. That is, the ECU operates based on the operational principle in which the type of passenger is identified by comparing the sum $W_{total}$ of weights measured by the sensors with a weight $W_c$ set as a reference. For example, a passenger is classified depending on whether $W_{total} \geq W_c$ or $W_{total} < W_c$ using $W_{total} = W_1 + W_2 + W_3 + W_4$ and $W_c$=passenger reference value.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a vehicle passenger classification system using a plurality of weight sensors and a dummy sensor installed under a vehicle seat and to provide various passenger classification logic that may be applied to the vehicle passenger classification system.

In various aspects of the present invention, the A vehicle passenger classification system, may include a plurality of weight sensors installed under a seat frame to support a load of a vehicle seat, a single dummy sensor installed under the seat frame to support the load of the vehicle seat along with the plurality of weight sensors, and a passenger classification logic unit for classifying a passenger as either a first class or a second class by comparing a total passenger value $W_{total}$ obtained by summing sensor values of the plurality of weight sensors with a first reference and a second reference.

The single dummy sensor and the plurality of weight sensors may be installed symmetrical with respect to left and right directions and forward and backward directions of the vehicle seat.

The first reference may be set to a maximum of passenger values that are classified as the first class and are less than a minimum of passenger values to be classified as the second class, and the second reference may be set to a minimum of passenger values that are classified as the second class and are greater than a maximum of passenger values to be classified as the first class.

The passenger classification logic unit may classify the passenger as the first class if the total passenger value $W_{total}$ is less than or equal to the first reference, classifies the passenger as the second class if the total passenger value $W_{total}$ is greater than or equal to the second reference, and performs at least one of a modification process of the total passenger value $W_{total}$ and a load distribution process if the total passenger value $W_{total}$ is greater than the first reference and less than the second reference.

The passenger classification logic unit may be configured to perform the modification process of the total passenger value $W_{total}$ by determining a sensor value of the dummy sensor from sensor values of the plurality of the weight sensors, modifying the total passenger value $W_{total}$ by adding the determined sensor value of the dummy sensor to a sum of the sensor values of the plurality of the weight sensors, and classifying the passenger as either the first class or the second class by comparing the modified total passenger value $W_{total}$ with the first reference and the second reference, wherein the sensor value of the dummy sensor is set to one of the sensor values of the plurality of the weight sensors and a proportional value that is determined based on locations of installation of the plurality of sensors inside the vehicle seat.

The passenger classification logic unit may be configured to perform the modification process of the total passenger value $W_{total}$ by modifying the total passenger value $W_{total}$ as a sum of sensor values of a part of the plurality of weight sensors together depending on a load distribution condition of the plurality of weight sensors and classifying the passenger as either the first class or the second class by comparing the modified total passenger value $W_{total}$ with a third reference. If a rear load of the vehicle seat is smaller by predetermined amounts than a front load thereof, the total passenger value $W_{total}$ may be determined by summing all the sensor values of the plurality of the weight sensors which are not aligned along with the dummy sensor in the forward direction of the vehicle seat, otherwise the total passenger value $W_{total}$ may be determined by summing all the sensor values of the plurality of the weight sensors.

The passenger classification logic unit may be configured to perform the load distribution process by deciding a first condition and a second condition based on a sensor load distribution condition depending on load correlation among the plurality of weight sensors.

The plurality of the weight sensors may include three weight sensors, and the three weight sensor and the single dummy sensor are installed on respective corners of the seat frame, wherein the single dummy sensor are installed one of front corners of the seat frame.

In another aspect of the present invention, the vehicle passenger classification method, may include the steps of, receiving sensor values from weight sensors installed under a seat frame so as to support load of a vehicle seat, classifying a passenger as either a first class or a second class by comparing a total passenger value $W_{total}$, obtained by summing the sensor values of the weight sensors together, with a first reference and a second reference, if the passenger value $W_{total}$ is greater than the first reference and less than the second reference, determining a sensor value of a single dummy sensor, installed under the seat frame and configured to support the load of the seat along with the weight sensors, from the sensor values of the weight sensors, and modifying the total passenger value $W_{total}$ by adding the sensor value of the dummy sensor to a sum of the sensor values of the weight sensors, and classifying the passenger as either the first class or the second class by comparing the modified total passenger value $W_{total}$ with the first reference and the second reference.

The passenger may be classified as the first class if the total passenger value $W_{total}$ is less than or equal to the first reference, and as the second class if the total passenger value $W_{total}$ is greater than or equal to the second reference.

The first reference may be set to a maximum of passenger values that are classified as the first class and are less than a minimum of passenger values to be classified as the second class, and the second reference is set to a minimum of passenger values that are classified as the second class and are greater than the maximum of passenger values to be classified as the first class.

The sensor value of the dummy sensor may be set to one of the sensor values of the weight sensors or a proportional value that is calculated based on locations of installation of the sensors inside the seat.

The vehicle passenger classification method may further include the step of, if the modified total passenger value $W_{total}'$ is greater than the first reference and less than the second reference, classifying the passenger as either the first class or the second class with consideration of a load distribution condition based on the sensor values of the weight sensors.

The total passenger value $W_{total}$ may be generated by adding the sensor values of the weight sensors or some of the weight sensors together depending on a load distribution condition based on the sensor values of the weight sensors.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various embodiments of a vehicle passenger classification system using a plurality of weight sensors and a dummy sensor on a vehicle seat according to the present invention will be described with reference to the accompanying drawings.

Figure 1:
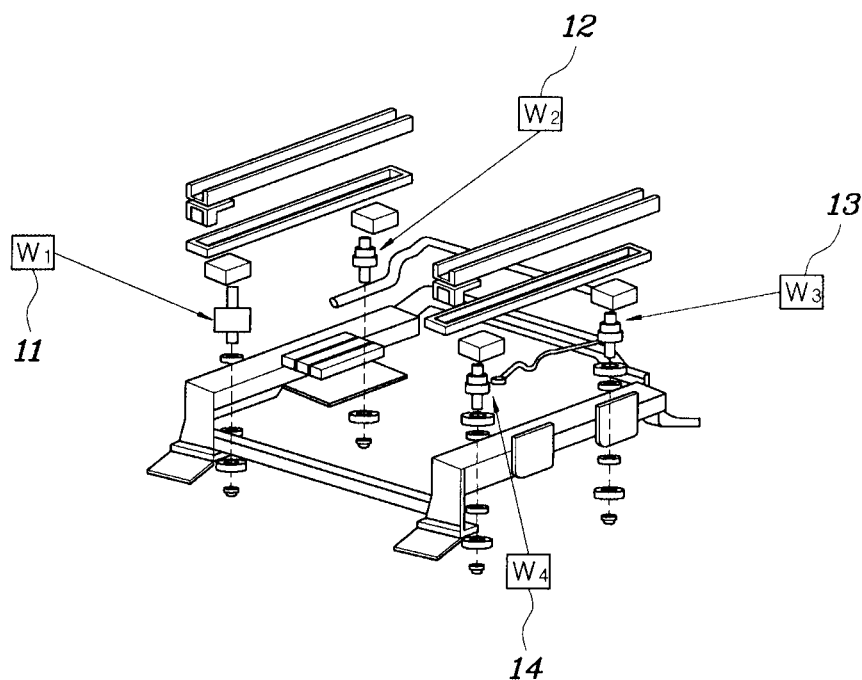
FIG. 1 is a diagram showing an example of the installation of weight sensors and a dummy sensor in an exemplary vehicle passenger classification system according to the present invention.
Figure 2:
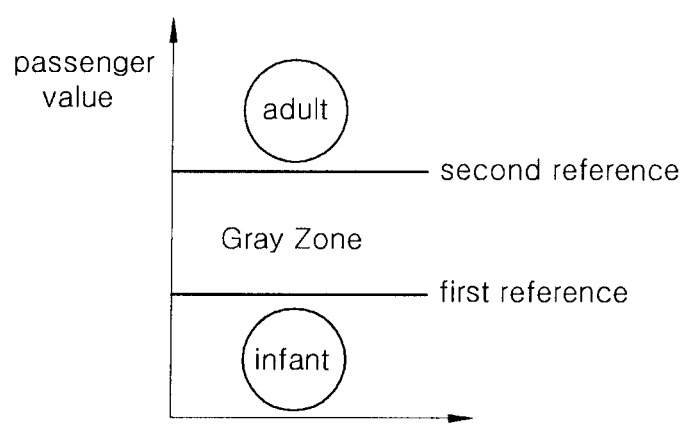
FIG. 2 is a diagram illustrating an example of determining passengers according to two classification criteria in an exemplary vehicle passenger classification system according to the present invention.

FIG. 1 is a diagram showing an example of the installation of weight sensors and a dummy sensor in a vehicle passenger classification system according to various embodiments of the present invention, and FIG. 2 is a diagram illustrating an example of classifying passengers according to two classification criteria in the vehicle passenger classification system according to various embodiments of the present invention.

The vehicle passenger classification system according to various embodiments of the present invention includes a plurality of weight sensors 12, 13 and 14 installed under a seat frame to support the load of a vehicle seat, and a single dummy sensor 11 installed under the seat frame to support the load of the vehicle seat along with the plurality of weight sensors. According to various embodiments of the present invention, a total of three weight sensors and a single dummy sensor are installed on respective corners of the seat frame, as shown in FIG. 1.

That is, the sensor $W_1$ of the existing weight detection-type passenger detection system is replaced with the dummy sensor such as a simple bolt, only three pieces of data measured by the remaining sensors $W_2$, $W_3$ and $W_4$ are transferred to the ECU of the passenger detection system, and a new passenger classification logic for identifying the type of passenger using the three pieces of data is provided.

Furthermore, since the sum of the loads applied to four sensors and the sum of the loads applied to three sensors can be used to indicate the difference between the weight of an infant and the weight of an adult in the same manner, passengers can be classified using only three sensors. If the classification is difficult, the classification may be performed using the distribution of loads and a load modification value.

The vehicle passenger classification system according to various embodiments of the present invention further includes a passenger classification logic unit for, based on sensor values, determining whether a passenger is in a seat or which type of passenger is in the seat. The passenger classification logic unit according to various embodiments of the present invention classifies a passenger as either class 1 or class 2 by comparing a passenger value $W_{total}$ obtained by summing the sensor values of the plurality of weight sensors 12, 13 and 14 with a first reference $W_{low}$ and a second reference $W_{high}$.

In various embodiments of the present invention, class 1 indicates a condition for not deploying an airbag because a child is in a passenger's seat or an infant's seat is installed on a passenger's seat, and class 2 indicates a condition for deploying an airbag because an adult passenger is in a passenger's seat. It is apparent that these classes may be set in a variety of manners and the definitions of the classes may be made in a variety of manners.

In various embodiments of the present invention, the first reference $W_{low}$ may be set to the maximum of the passenger values $W_{total}$ that are classified as class 1 and are less than the minimum of the passenger values $W_{total}$ to be classified as class 2. In contrast, the second reference $W_{high}$ may be set to the minimum of the passenger values $W_{total}$ that are classified as class 2 and are greater than the maximum of the passenger values $W_{total}$ to be classified as class 1.

The passenger values $W_{total}$ that are classified as class 1 and the passenger values $W_{total}$ to be classified as class 2 are determined based on sensing weight distribution. Below table 1 is an example of reference determination way based on the sensing weight distribution.

TABLE 1

| Passenger Type | Details | Class | Sensing weight distribution 4WCS | 3WCS |
|---|---|---|---|---|
| 1 yr child | On CRS | Class 1 | 11.3 Kg~25.7 Kg | 1.7 Kg~22.0 Kg |
| 3 yr child | On CRS | Class 1 | 20.0 Kg~28.9 Kg | 14.0 Kg~25.4 Kg |
| | On Booster Seat | Class 1 | 17.6 Kg~28.3 Kg | 16.9 Kg~24.5 Kg |
| | 3 yr child Only | Class 1 | 15.2 Kg~17.7 Kg | 7.6 Kg~22.1 Kg |
| 6 yr child | On Booster Seat | Class 1 | 24.4 Kg~28.5 Kg | 22.9 Kg~25.7 Kg |
| | 6 yr child Only | Class 1 | 23.1 Kg~24.3 Kg | 13.3 Kg~25.9 Kg |
| First Reference for Class 1 | | | 28.9 Kg | 25.9 Kg |
| Second Reference for Class 2 | | | 30.0 Kg | 26.2 Kg |
| 5% female | | Class 2 | 30.0 Kg~44.8 Kg | 26.2 Kg~42.7 Kg |
| 95% male | | Class 2 | 69.2 Kg~89.3 Kg | 62.8 Kg~81.4 Kg |

Referring to the table 1, under the condition of 3WCS, types of 1 yr child, 3 yr child and 6 yr child should be classified to class 1 therefore, the passenger values $W_{total}$ that are classified as class 1 is in range of 1.7 Kg~25.9 Kg. And types of female and male should be classified to class 2 therefore, the passenger values $W_{total}$ that are classified as class 2 is in range of 926.2 kg~81.4 Kg.

In that case, the First Reference $W_{low}$ is set to the maximum value 25.9 Kg of the passenger values 1.7 Kg~25.9 Kg that are classified as class 1 and are less than the minimum value 26.2 kg of the passenger values 26.2 kg~81.4 Kg to be classified as class 2. The second reference $W_{high}$ is set to the minimum value 26.2 kg of the passenger values 26.2 kg~81.4 Kg that are classified as class 2 and are greater than the maximum value 25.9 Kg of the passenger values 1.7 Kg~25.9 Kg to be classified as class 1.

As shown in FIG. 2, the passenger classification logic unit according to various embodiments of the present invention may classify a passenger value $W_{total}$ which is obtained by summing the sensor values of the plurality of weight sensors 12, 13 and 14, as class 1 for an infant if this passenger value $W_{total}$ is less than or equal to the first reference $W_{low}$. In contrast, the passenger classification logic unit classifies a passenger as class 2 for an adult if this passenger value $W_{total}$ is greater than or equal to the second reference $W_{high}$. Meanwhile, if a passenger value $W_{total}$ is greater than the first reference $W_{low}$ and is less than the second reference $W_{high}$, that is, if it falls within a gray zone, this passenger value $W_{total}$ is modified or an additional condition may be considered.

Figure 3:
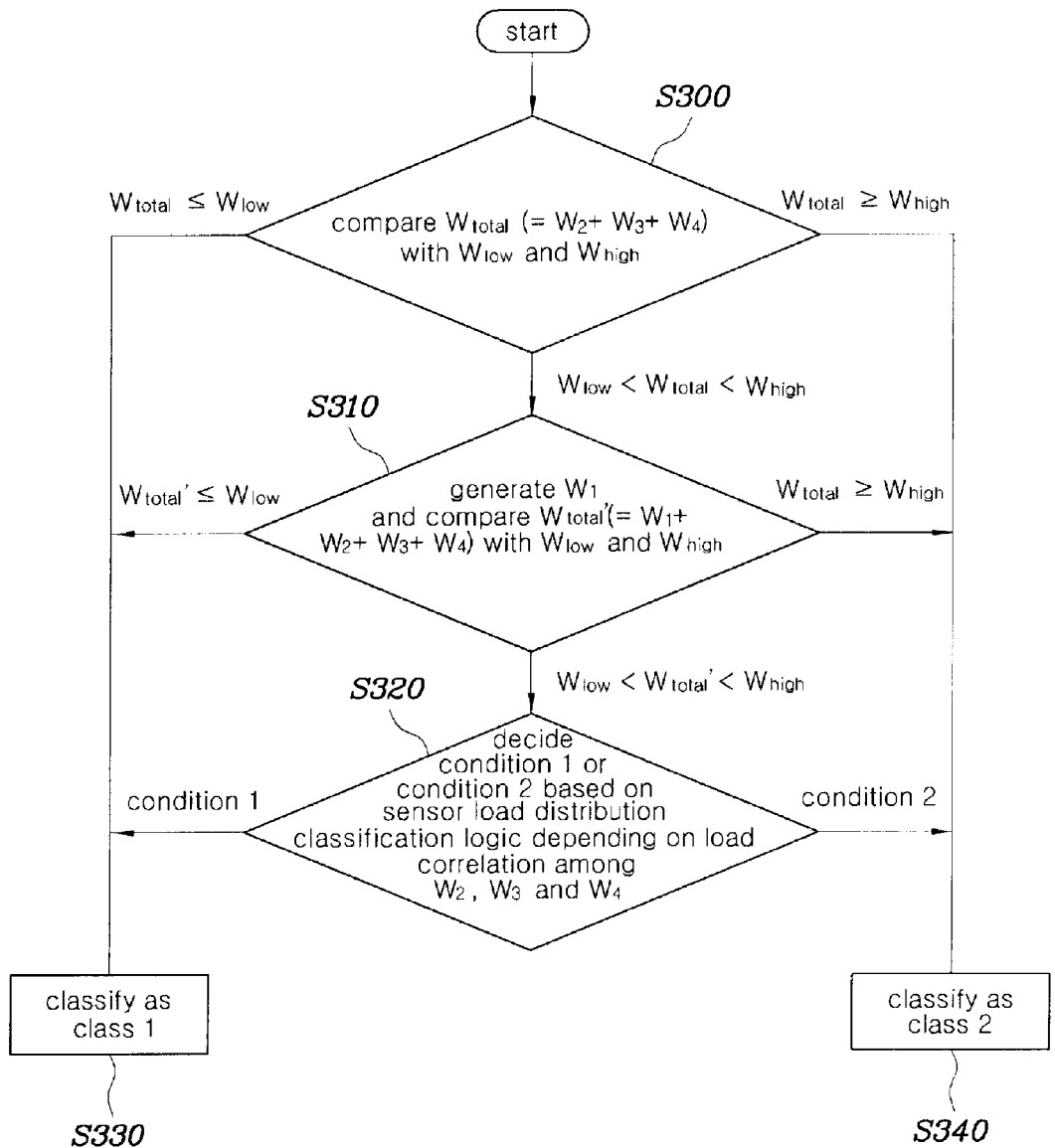
FIG. 3 is a first flowchart showing the operation of the passenger classification logic unit of an exemplary vehicle passenger classification system according to the present invention.

FIG. 3 is a first flowchart showing the operation of the passenger classification logic unit of a vehicle passenger classification system according to various embodiments of the present invention.

According to various embodiments of the present invention, at step S300, a passenger value $W_{total}$ is calculated by adding the sensor values $W_2$, $W_3$ and $W_4$ of the plurality of weight sensors 12, 13 and 14 first. Furthermore, this passenger is classified as either class 1 or class 2 by comparing the calculated passenger value $W_{total}$ with the first reference and the second reference. That is, if the calculated passenger value $W_{total}$ is less than or equal to the first reference $W_{low}$ ($W_{total} \leqq W_{low}$), the passenger is classified as class 1 at step S330. If the calculated passenger value $W_{total}$ is greater than or equal to the second reference $W_{high}$ ($W_{total} \geqq W_{high}$), the passenger is classified as class 2 at step S340.

Meanwhile, in various embodiments of the present invention, if the passenger value $W_{total}$ is greater than the first reference $W_{low}$ and is less than the second reference $W_{high}$ ($W_{low} < W_{total} < W_{high}$), the passenger value $W_{total}$ is modified at step S310.

Here, when modifying the passenger value $W_{total}$ at step S310, the passenger classification logic unit calculates the sensor value $W_1$ of the dummy sensor 11 from the sensor values $W_2$, $W_3$, and $W_4$ of the weight sensors 12, 13 and 14.

At this time, the sensor value $W_1$ of the dummy sensor 11 may be set to any one of the sensor values $W_2$, $W_3$ and $W_4$ of the weight sensors 12, 13 and 14, for example, $W_2$. Alternatively, the sensor value $W_1$ of the dummy sensor 11 may be set to a proportional value that is calculated based on the locations at which the sensors are installed under a seat, for example, $W_4 \times (W_2/W_3)$ or $W_2 \times (W_4/W_3)$.

Thereafter, the passenger value $W_{total}$ is modified by adding the sensor value $W_1$ of the dummy sensor 11 to the sum of the sensor values $W_2$, $W_3$ and $W_4$ of the weight sensors 12, 13 and 14. Finally, this passenger is classified as either class 1 or class 2 by comparing the modified passenger value $W_{total}'$ with the first reference and the second reference. That is, if the modified passenger value $W_{total}'$ is less than or equal to the first reference $W_{low}$ ($W_{total}' \leqq W_{low}$), the passenger is classified as class 1 at step S330. In contrast, if the modified passenger value $W_{total}'$ is greater and equal to the second reference $W_{high}$ ($W_{total}' \geqq W_{high}$), the passenger is classified as class 1 at step S340.

Meanwhile, if the modified passenger value $W_{total}'$ is also greater than the first reference $W_{low}$ and less than the second reference $W_{high}$ ($W_{low} < W_{total}' < W_{high}$), the passenger is classified with a load distribution condition based on the sensor values $W_2$, $W_3$ and $W_4$ of the weight sensors 12, 13 and 14 being further considered at step S320.

The load distribution condition according to various embodiments of the present invention may be set using the distribution of three sensor load values. For example, condition 1 may be set to the case where the passenger value $W_{total}$ is $W_{low} < W_{total} < W_{high}$ and the load of $W_4$ is equal to or greater than 10% of $W_3$ and equal to or less than 30% of $W_3$, while condition 2 may be set to the case where the passenger value $W_{total}$ is $W_{low} < W_{total} < W < W_{high}$ and each load of $W_2$, $W_3$ and $W_4$ have has a difference less than 10%.

Meanwhile, in the case where condition 1 is met, the case is classified as class 1 at step S330. In contrast, in the case where condition 2 is met, the case is classified as class 2 at step S340.

Figure 4:
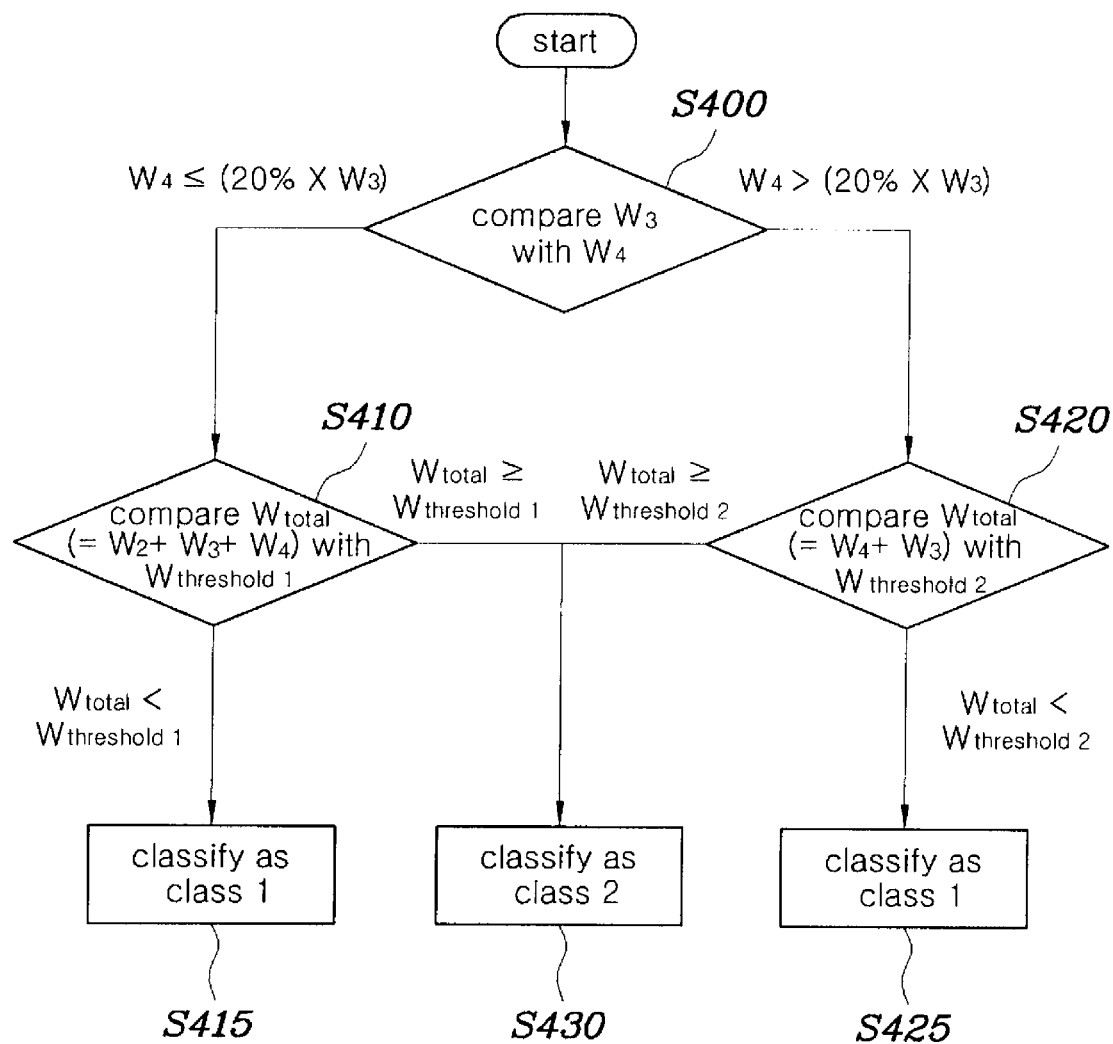
FIG. 4 is a second flowchart showing the operation of the passenger classification logic unit of an exemplary vehicle passenger classification system according to the present invention.

FIG. 4 is a second flowchart showing the operation of the passenger classification logic unit of a vehicle passenger classification system according to other embodiments of the present invention.

In various embodiments of the present invention, in particular, a method of classifying passengers with consideration further given to the load distribution condition based on the sensor values $W_2$, $W_3$ and $W_4$ of the weight sensors 12, 13 and 14. According to various embodiments of the present invention, a logic in which double classification is performed based on the load distribution condition is used. For example, the load distribution condition is taken into account before the passenger value $W_{total}$ is calculated by adding the sensor values $W_2$, $W_3$ and $W_4$ of the weight sensors 12, 13 and 14 together. This consideration depends on a passenger's seating posture. For example, the posture in which the passenger sits on the rear portion of the seat corresponds to the case where the loads of the two rear sensors are greater than the load of the front sensor. In this case, the passenger value $W_{total}$ is calculated using the sum of the loads of three sensors. Meanwhile, the posture in which a passenger sits on the front portion of the seat corresponds to the case where the front sensor is greater. In this case, the passenger value $W_{total}$ is calculated using the sum of the loads of the two right sensors.

For example, at step S400, when $W_3$ and $W_4$ are compared with each other, classification as the case where $W_4$ is equal to or less than 20% of $W_3$ or the other case, that is, the case where $W_4$ is greater than 20% of $W_3$, is made. Accordingly, if $W_4$ is less than or equal to 20% of $W_3$, the passenger value $W_{total}$ is calculated by adding the sensor value $W_2$, $W_3$ and $W_4$ of the weight sensors 12, 13 and 14 together at step S410. Thereafter, the calculated passenger value $W_{total}$ is compared with a first reference $W_{threshold1}$. If the calculated passenger value $W_{total}$ is less than the first reference $W_{threshold1}$, the passenger is classified as class 1 at step S415. Otherwise the passenger is classified as class 2 at step S430.

Furthermore, if $W_4$ is greater than 20% of $W_3$ at step S400, the passenger value $W_{total}$ is calculated by summing the sensor values $W_3$ and $W_4$ of some of the weight sensors 12, 13 and 14 together at step S420. Thereafter, this calculated passenger value $W_{total}$ is compared with a second reference $W_{threshold2}$. If the calculated passenger value $W_{total}$ is less than the second reference $W_{threshold2}$, the passenger is classified as class 1 at step S425. Otherwise the passenger is classified as class 2 at step S430.

In various embodiments of the present invention, $W_3$ and $W_4$ are compared with each other at step S400. For example, classification as the case where $W_4$ is less than or equal to 20% of $W_3$ or the other case, that is, the case where $W_4$ is greater than 20% of $W_3$. Accordingly, the passenger value $W_{total}$ is calculated at steps S410 and S420. A passenger may be classified by applying the embodiments described in conjunction with FIG. 3 on the basis of the calculated passenger value $W_{total}$.

Meanwhile, it will be apparent that the determination of the load distribution condition based on the above-described embodiments may vary with the type of vehicle. Furthermore, each of the various classification logics disclosed in the above-described embodiments may be composed of a single logic or a combination of a plurality of sub-logics in line with the vehicle. Each of the various classification logics may be a simple sequential combination of sub-logics or a conditional equation combination of respective sub-logics.

Since the cost of passenger weight diction-type passenger sensors is high, the present invention has an advantage in that the number of sensors is reduced, thereby reducing the cost of the sensors.

For example, the cost reduction effect of about 12,000 won can be achieved due to 10000 won for a sensor, a reduction in the wire harness/connector and the simplification of an ECU.

Furthermore, the system becomes robust because due to the reduction in the number of sensors, the possibility of the failure of the system is reduced and the cost of after sales service is reduced.

Furthermore, due to the use of various sub-logics, there are advantages in that classification performance response is easy, the implementation of a suitable logic is possible, and classification performance is improved due to a reduction in management deviation.

Moreover, the present invention has an advantage in that the weight of the system is reduced thanks to a reduction in a wire harness.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A vehicle passenger classification system, comprising:
a plurality of weight sensors installed under a seat frame supporting a load of a vehicle seat;
a single dummy sensor installed under the seat frame supporting the load of the vehicle seat along with the plurality of weight sensors; and
a passenger classification logic unit configured to classify a passenger as either a first class or a second class by comparing a total passenger value ($W_{total}$) obtained by summing sensor values of the plurality of weight sensors with a first reference and a second reference,
wherein the passenger classification logic unit classifies the passenger as the first class if the total passenger value ($W_{total}$) is less than or equal to the first reference, classifies the passenger as the second class if the total passenger value ($W_{total}$) is greater than or equal to the second reference, and performs at least one of a modification process of the total passenger value ($W_{total}$) and a load distribution process if the total passenger value ($W_{total}$) is greater than the first reference and less than the second reference; and
wherein the passenger classification logic unit is configured to perform the modification process of the total passenger value ($W_{total}$) by determining a sensor value of the dummy sensor from sensor values of the plurality of the weight sensors, modifying the total passenger value ($W_{total}$) by adding the determined sensor value of the dummy sensor to a sum of the sensor values of the plurality of the weight sensors, and classifying the passenger as either the first class or the second class by comparing the modified total passenger value ($W_{total}'$) with the first reference and the second reference.

2. The vehicle passenger classification system as set forth in claim 1, wherein the single dummy sensor and the plurality of weight sensors are installed symmetrically with respect to left and right directions and forward and backward directions of the vehicle seat.

3. The vehicle passenger classification system as set forth in claim 1, wherein the first reference is set to a maximum of passenger values that are classified as the first class and are less than a minimum of passenger values that are classified as the second class, and the second reference is set to the minimum of passenger values that are classified as the second class and are greater than the maximum of passenger values that are classified as the first class.

4. The vehicle passenger classification system as set forth in claim 1, wherein the sensor value of the dummy sensor is set to one of the sensor values of the plurality of the weight sensors and a proportional value that is determined based on locations of installation of the plurality of sensors inside the vehicle seat.

5. The vehicle passenger classification system as set forth in claim 1, wherein the passenger classification logic unit is configured to perform the modification process of the total passenger value ($W_{total}$) by modifying the total passenger value ($W_{total}$) as a sum of sensor values of a part of the plurality of weight sensors together depending on a load distribution condition of the plurality of weight sensors and classifying the passenger as either the first class or the second class by comparing the modified total passenger value ($W_{total}$) with a third reference.

6. The vehicle passenger classification system as set forth in claim 5, if a rear load of the vehicle seat is smaller by predetermined amounts than a front load thereof, the total passenger value ($W_{total}$) is determined by summing all the sensor values of the plurality of the weight sensors which are not aligned along with the dummy sensor in the forward direction of the vehicle seat, otherwise the total passenger value ($W_{total}$) is determined by summing all the sensor values of the plurality of the weight sensors.

7. The vehicle passenger classification system as set forth in claim 1, wherein the passenger classification logic unit is configured to perform the load distribution process by deciding a first condition and a second condition based on a sensor load distribution condition depending on load correlation among the plurality of weight sensors.

8. The vehicle passenger classification system as set forth in claim 1, wherein the plurality of the weight sensors includes three weight sensors, and the three weight sensor and the single dummy sensor are installed on respective corners of the seat frame.

9. The vehicle passenger classification system as set forth in claim 8, wherein the single dummy sensor is installed one of front corners of the seat frame.

10. A vehicle passenger classification method, comprising the steps of:
receiving sensor values from weight sensors installed under a seat frame, the seat frame supporting a load of a vehicle seat;
classifying a passenger as either a first class or a second class by comparing a total passenger value ($W_{total}$), obtained by summing the sensor values of the weight sensors together, with a first reference and a second reference;
if the passenger value ($W_{total}$) is greater than the first reference and less than the second reference, determining a sensor value of a single dummy sensor, installed under the seat frame and configured to support the load of the seat along with the weight sensors, from the sensor values of the weight sensors, and modifying the total passenger value ($W_{total}$) by adding the sensor value of the dummy sensor to a sum of the sensor values of the weight sensors; and
classifying the passenger as either the first class or the second class by comparing the modified total passenger value ($W_{total}$) with the first reference and the second reference.

11. The vehicle passenger classification method as set forth in claim 10, wherein the passenger is classified as the first class if the total passenger value ($W_{total}$) is less than or equal to the first reference, and as the second class if the total passenger value ($W_{total}$) is greater than or equal to the second reference.

12. The vehicle passenger classification method as set forth in claim 10, wherein the first reference is set to a maximum of passenger values that are classified as the first class and are less than a minimum of passenger values that are classified as the second class, and the second reference is set to the minimum of passenger values that are classified as the second class and are greater than the maximum of passenger values that are classified as the first class.

13. The vehicle passenger classification method as set forth in claim 10, wherein the sensor value of the dummy sensor is set to one of the sensor values of the weight sensors or a proportional value that is calculated based on locations of installation of the sensors inside the seat.

14. The vehicle passenger classification method as set forth in claim 10, further comprising the step of, if the modified total passenger value ($W_{total}$) is greater than the first reference and less than the second reference, classifying the passenger as either the first class or the second class with consideration of a load distribution condition based on the sensor values of the weight sensors.

15. The vehicle passenger classification method as set forth in claim 10, wherein the total passenger value ($W_{total}$) is generated by adding the sensor values of the weight sensors or some of the weight sensors together depending on a load distribution condition based on the sensor values of the weight sensors.

\* \* \* \* \*